United States Patent [19]

Leini

[11] Patent Number: 4,934,056
[45] Date of Patent: Jun. 19, 1990

[54] SAWBLADES FOR A POWER SAW WITH RECIPROCATING BLADES

[75] Inventor: Arvo Leini, Edsbyn, Sweden
[73] Assignee: Sandvik AB, Sandviken, Sweden
[21] Appl. No.: 349,763
[22] Filed: May 10, 1989
[30] Foreign Application Priority Data May 11, 1988 [SE] Sweden .................................. 8801785

[51] Int. Cl.$^5$ .............................................. D23D 49/10
[52] U.S. Cl. ........................................ 30/369; 30/166.3
[58] Field of Search .................... 80/369, 272.4, 166.3, 80/392, 394; 83/835, 836, 847, 851–855

[56] References Cited

U.S. PATENT DOCUMENTS 1,491,134  4/1924  Northall .
2,840,125  6/1958  Kirksey ................................. 30/369

FOREIGN PATENT DOCUMENTS 2134038  8/1984  United Kingdom .

Primary Examiner—Douglas D. Watts
Attorney, Agent, or Firm—Burns, Doane, Swecker & Mathis

[57] ABSTRACT

Sawblade for a powered saw with of the type in which two of the sawblades reciprocate side-by-side in a groove on the underside of the guidebar. A downward force from the guidebar is transmitted to a plurality of short longitudinally spaced ledge section projecting from the outer side faces of the sawblade. The ledges are formed by outwardly bent portions of the sawblade. The ledges can be slightly convex as viewed from the side.

2 Claims, 1 Drawing Sheet

U.S. Patent Jun. 19, 1990 4,934,056
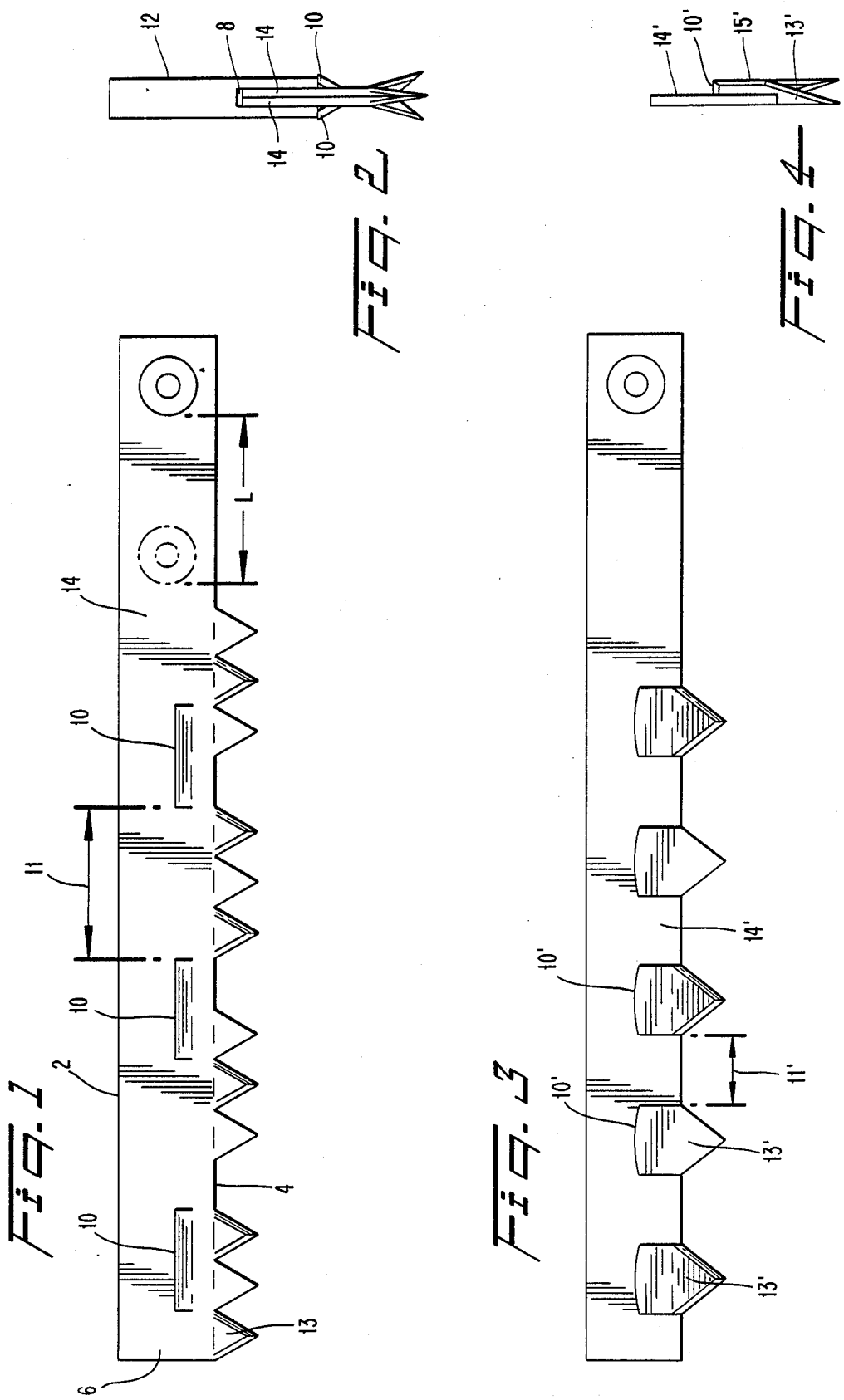

SAWBLADES FOR A POWER SAW WITH RECIPROCATING BLADES

BACKGROUND AND OBJECTS OF THE INVENTION

Many power saws are known, comprising two reciprocating sawblades supported by a guidebar extending in front of the motor unit. The guidebar is often made with a groove in which the thin upper parts of the sawblades slide in opposite directions. This type of power saw has low vibrations and low resultant forces in use. Examples of this type of saw are found in the patents U.S. Pat. Nos. 1,491,134 and 2,840,125, and British Patent 2, 134,038.

The sawblades are in sliding contact with each other to avoid sawdust and fibers penetrating between the blades, which could pry them apart and make them stick in the groove. In the known saws the force from the outer layers of the guidebar is transmitted to ledges running the whole length of the sawblades on the outside, which helps to maintain the contact between the blades. Such ledges can be created by milling in thick material, by joining layers of thin material or by bending or folding a single layer of thin material as described in application SE 86 04232-2.

Ledges which are continuous but with varying width to facilitate the sawdust transport from selected teeth are described in patent U.S. Pat. No. 2,840,122.

One problem with continuous ledges is that they are difficult to lubricate except by oil supply to the guidebar groove, which requires some kind of a pump. Another problem is that trapped particles of dirt on the ledges are not automatically expelled.

The purpose of the present invention is to make possible a low cost sawblade which can be lubricated from the outside, and which has self-cleaning ledges. It is particularly suited to sawblades with teeth of another material than the body of a sawblade, especially tungsten carbide teeth.

BRIEF DESCRIPTION OF THE DRAWING

The invention is described with reference to the figures, wherein:

FIG. 1 shows a sawblade made wholly of steel in a side view;

FIG. 2 is a cross-sectional view of the invention depicted in FIG. 1;

FIG. 3 shows a sawblade of steel with carbide teeth; and

FIG. 4 is a view shown in cross-section of FIG. 4.

DETAILED DESCRIPTION OF PREFERRED EMBODIMENTS OF THE INVENTION

Depicted in FIGS. 1 and 2 is a sawblade body 14 comprising an upper edge 2, a lower cutting edge 4 having teeth 13, and side surfaces 6 interconnecting the upper and lower edges. Two sawblades are mounted in a groove 8 of a guidebar 12 for reciprocal movement relative to one another so as to undergo forward and rearward longitudinal strokes. A stroke length L is defined as a distance traveled during one of the strokes. Longitudinally spaced ledges 10 project outwardly from side surfaces 6 of the blades and are adapted to be acted upon by the guidebar.

According to the invention the ledges are not made continuous but divided into a number of short sections (10). The intervals (11) between adjacent ones of these are shorter than the stroke length L of the reciprocating mechanism, in order that the whole underside of the guidebar (12) shall be uniformly worn without remaining corners or asperities.

The short sections (10) of the ledges can be formed in different ways. On a sawblade made from a single steel plate of equal thickness, they can be made by punching slits through the blade parallel to the upper edge, in the process bending the material below the slits outwards to let the exposed edges of the slits form such sections (10) to slide against the underside of the guidebar (12).

On a sawblade comprising a blade body (14′) of steel with brazed teeth (13′) of hard metal such as tungsten carbide (see FIGS. 3, 4), the short sections (10′) can be formed by making the teeth (13′) thicker than the blade body (14′) and with a slightly convex (as viewed from the side) upper surface forming the ledge section (10, 10′). To lower the friction against the saw material, the outer surfaces (15′) of the teeth (13′) can advantageously be made slightly convex.

The ledge sections (10, 10′) and the underside of the outer layers of the guidebar (12) are preferably made close to perpendicular to the plane of blade body. A slope such that the outer edge of the ledge sections (10) is higher than the rest of the ledge surface will lower the pressure between the sawblades, resulting in less wear and friction, while a slope such that the edge of the ledge sections (10, 10′) is lower will increase the pressure and lessen the risk of fibers and particles penetrating between the sawblades.

The shape of the teeth should be determined by the material to be sawed, but in general they should be shaped to produce a limited inwards pressure on the blades against each other. This can be done by increasing the number or length of those teeth which have their cutting points close to or intersecting the plane of contact between the two sawblades.

I claim:

1. A sawblade for use in a power saw wherein two of said sawblades are arranged side-by-side in a groove of a power saw guidebar and are reciprocable relative to one another so as to undergo a forward stroke and a rearward stroke during a reciprocal cycle, a stroke length of said sawblade being defined by a distance traveled during one of said strokes, said sawblade including an upper edge, a lower cutting edge, inner and outer side surfaces interconnecting said upper and lower edges, and a plurality of ledges projecting outwardly from one of said side surfaces to be acted upon by bottom edges of the guidebar, adjacent ones of said ledges being spaced apart in the direction of sawblade reciprocation by a distance which is shorter than said stroke length, said sawblade including a plurality of slits disposed intermediate said upper and lower edges, with portions of said sawblade disposed beneath said slits being bent outwardly to define said ledges.

2. A sawblade for use in a power saw wherein two of said sawblades are arranged side-by-side in a groove of a power saw guidebar and are reciprocable relative to one another so as to undergo a forward stroke and a rearward stroke during a reciprocal cycle, a stroke length of said sawblade being defined by a distance traveled during one of said strokes, said sawblade including an upper edge, a lower cutting edge, inner and outer side surfaces interconnecting said upper and lower edges, and a plurality of ledges projecting outwardly from one of said side surfaces to be acted upon by bottom edges of the guidebar, adjacent ones of said ledges being spaced apart in the direction of sawblade reciprocation a distance which is shorter than said stroke length, each of said ledges being slightly convex as said sawblade is viewed from the side.

* * * * *